UNITED STATES PATENT OFFICE.

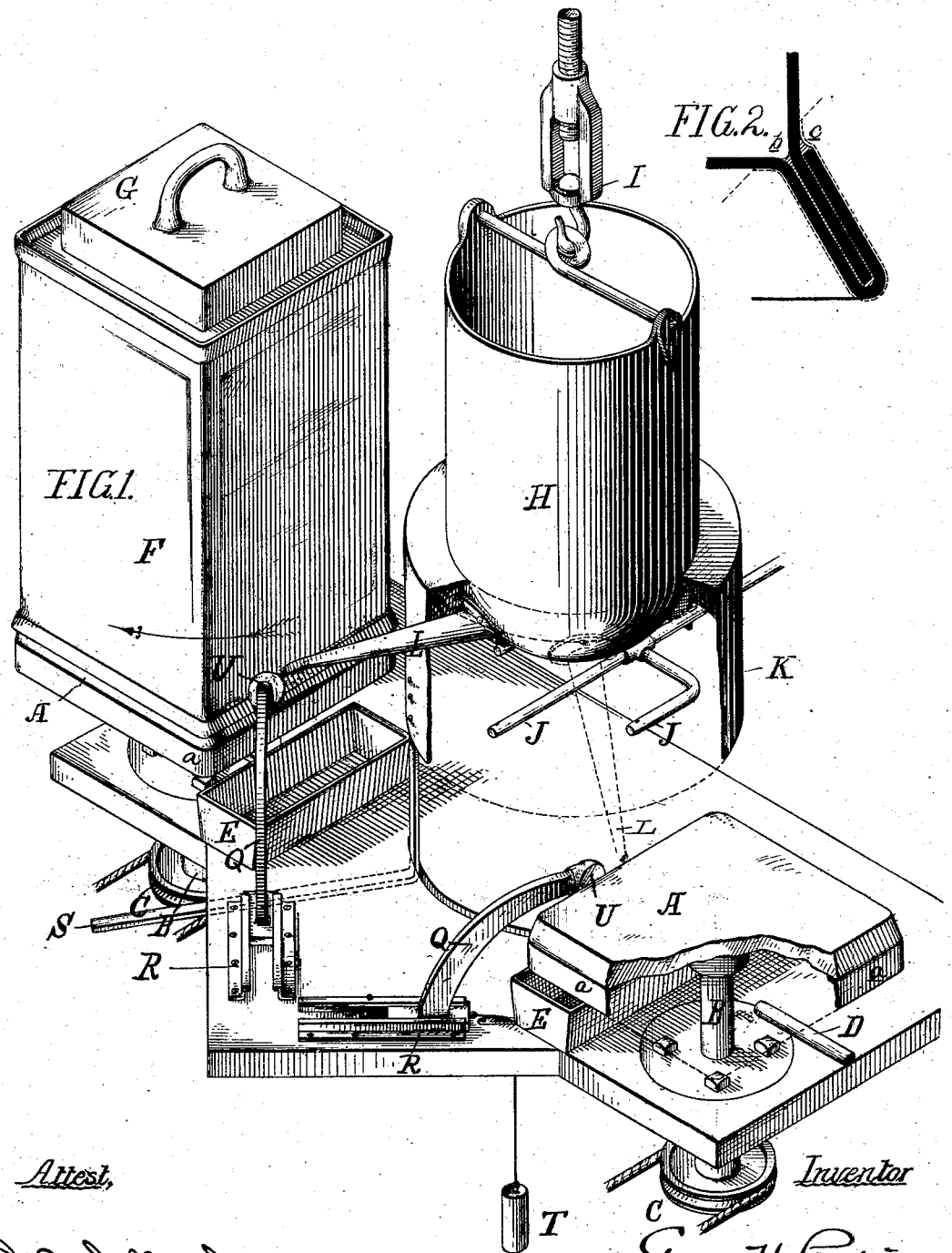

GEORGE H. PERKINS, OF PHILADELPHIA, PENNSYLVANIA.

SOLDERING-MACHINE.

SPECIFICATION forming part of Letters Patent No. 227,826, dated May 18, 1880.

Application filed March 13, 1880. (Model.)

*To all whom it may concern:*

Be it known that I, GEORGE H. PERKINS, of Philadelphia, Pennsylvania, have invented an Improvement in Soldering-Machines, of which the following is a specification, reference being made to the accompanying drawings, forming part hereof, of which—

Figure 1 is a perspective view of a soldering apparatus embodying my invention; and Fig. 2, a cross-section of a seam of a can, indicating in sectional lines the position of the solder as fed by my device, and indicating, also, in dotted lines, the position of the solder in the old process of dipping.

My invention relates to devices employed to seal or solder the previously-formed seams of cans; and its object is to dispense with methods of dipping the joints, and to construct an apparatus by which the solder is automatically fed against the joint and into the interstices thereof.

The invention is described and illustrated with reference to rectangular petroleum-cans, but is capable of use with other forms of cans or vessels.

In the drawings, A are rotating beds, best formed of the outline of the can or other vessel, which they are to uphold. They are erected upon and designed to rotate with spindles B, revolved by pulleys C or otherwise. The beds are provided with depending diaphragms *a*, to retain the heat, which is applied from beneath.

Beneath the beds, and in such relation thereto as to insure perfect heating, are benzine-burners D, or other heat conveying or generating devices, whose object is to heat and retain in a heated condition the beds.

E are drip-troughs, located in such relation to the beds as to catch the drip from the seam which is under process of soldering.

F is a rectangular petroleum-can, formed with a countersunk head, and of such size as to closely fit over the bed upon which it is rested.

G is a weight placed upon the can after the latter has been placed upon the bed, with a view to retain the can fixedly in place upon the bed.

H is a solder-pot, suspended by a swivel, I, or the like from any convenient support. The pot is filled with solder, which is kept in a molten condition by a benzine-burner, J, or other heating device, located within a hood, K, affixed to and depending from the pot.

L is a spout branching out laterally from the base of the pot, through which molten solder is caused to flow to the seam. The spout may be provided with a regulating-cock.

The pot is controlled to swing about its swivel by means of a handle or lever-arm, S, connected with the pot or the diaphragm thereof. By the movement of the handle the spout can alternately be brought to bear upon cans placed on either bed—that is to say, it can be brought from the position shown in full lines in the drawings to that shown in dotted lines therein, and vice versa.

Q are wipers, being upright arms traveling in ways R upon the frame-work, and controlled by cord and pulley and counterweight devices T, or by other analogous appliances designed to keep the wiping-faces U constantly against the seams of the cans as the latter are rotated.

In practice, I prefer to employ in each apparatus two rotating beds and a solder-pot intermediately placed between the two, so that after one can is soldered it can be removed and an unsoldered can placed upon the vacant bed while the other can is being soldered.

In the drawings, the right-hand bed is broken away to illustrate its construction, no can being placed upon it in order not to obscure the drawings. In practice, the burners having been started, the beds heated up, and the solder reduced to a molten condition, a can is placed upon each of the two beds and a weight upon each can. The solder-pot is then swung by its handle about its pivot, so as to bring its spout into contact, for instance, with, first, the seam of the left-hand can at the point where the edge of the turned-over metal of the bottom (or top) meets the side body, and the bed is then rotated so that each portion of the length of the seam is brought into contact with the spout, the solder from which pours into the seam at a point marked *c* in Fig. 2, whence it flows down and around the bend up to the point *b*.

The spout during the rotation of the can is held against the seam of the can, of whatever shape the latter may be, the swiveling permitting of the rounding of corners. The wiper follows, so to speak, the spout, being placed in such relation to the same as to wipe the edge of the seam clean of surplus solder, the tension of the counter-weight upon the wiper being such that it also is retained in close contact with the seam throughout its extent, even when rounding the corners.

Any suitable material may be employed to form the wiping-face U.

After the left-hand can has been soldered, as above set forth, the pot is rotated and its spout brought into the position represented in dotted lines—that is to say, into contact with the seam of the right-hand can—and the process is repeated with respect to such can.

Having thus described my invention, I claim and desire to secure by Letters Patent of the United States—

1. In combination with one or more rotating beds provided with means for heating them, a solder-pot movably arranged with its spout-nozzle against the seam of a can rotated by a bed, and means for pressing the nozzle against the rotating seam, substantially as described.

2. In combination with a rotating bed, an adjustable wiper movably arranged with its wiping-face against the seam of a can rotated by the bed, and means for pressing the wiping-face against the rotating seam, substantially as described.

3. The combination, with two or more rotating beds provided with two or more wipers movably arranged with their wiping-faces pressed against the seams of cans rotated by the bed, of a solder-pot movably arranged, so that its spout-nozzle can be successively pressed against and held in contact with the seams of cans placed upon and rotated by the beds, substantially as described.

In testimony whereof I have hereunto signed my name this 11th day of February, A. D. 1880.

GEORGE H. PERKINS.

In presence of—
J. BONSALL TAYLOR,
C. B. TAYLOR.